US010383085B2

(12) United States Patent
Küchler et al.

(10) Patent No.: US 10,383,085 B2
(45) Date of Patent: Aug. 13, 2019

(54) RANGE DETERMINING MODULE AND ASSOCIATED METHODS AND APPARATUS

(71) Applicant: NXP B.V., Eindhoven (NL)

(72) Inventors: Wolfgang Küchler, Graz (AT); Ghiath Al-kadi, Graz (AT); Hendrik Ahlendorf, Flein (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/944,180

(22) Filed: Apr. 3, 2018

(65) Prior Publication Data

US 2018/0288730 A1 Oct. 4, 2018

(30) Foreign Application Priority Data

Apr. 3, 2017 (EP) ..................................... 17164622

(51) Int. Cl.
*H04W 64/00* (2009.01)
*H04L 5/00* (2006.01)
*H04L 1/20* (2006.01)
*H04L 9/08* (2006.01)
*H04L 9/32* (2006.01)
(Continued)

(52) U.S. Cl.
CPC ............. *H04W 64/003* (2013.01); *H04L 1/20* (2013.01); *H04L 5/0069* (2013.01); *H04L 9/0825* (2013.01); *H04L 9/3228* (2013.01); *H04L 9/3297* (2013.01); *H04W 4/02* (2013.01); *H04W 4/029* (2018.02); *H04W 4/70* (2018.02);
(Continued)

(58) Field of Classification Search
CPC . H04L 63/0428; H04L 9/0861; H04L 9/0869; H04L 9/3226; H04L 9/3247; H04W 12/06; G06Q 20/32
See application file for complete search history.

(56) References Cited

U.S. PATENT DOCUMENTS

| 4,229,737 A * | 10/1980 | Heldwein ............. G01S 13/876 342/395 |
| 6,222,440 B1 * | 4/2001 | Heller ................ G06K 7/10019 340/10.3 |

(Continued)

OTHER PUBLICATIONS

IEEE Computer Society, "IEEE Standard for Low-Rate Wireless Personal Area Networks (WPANs)", IEEE Std 802.15.4™-2015 (Revision of IEEE Std 802.15.4-2011), LAN/MAN Standards Committee, pp. 1-709 (2015).

(Continued)

*Primary Examiner* — Dung Hong
(74) *Attorney, Agent, or Firm* — Rajeev Madnawat

(57) ABSTRACT

The disclosure relates to range-determining-module for a transceiver, configured to: receive a signal comprising a received-data-packet, identify a plurality of known-sequence-sections of the received-data-packet, each known-sequence-section containing a known-data-sequence that is known to the range-determining-module; determine a reception-time-stamp associated with each of the plurality of known-sequence-sections; verify the received-data-packet using the reception-time-stamps associated with different respective known-sequence-sections of the received-data-packet; and provide a verified range estimate in accordance with one or more of the time stamps of the verified received-data-packet.

15 Claims, 9 Drawing Sheets

(51) Int. Cl.
  *H04W 4/029* (2018.01)
  *H04W 4/70* (2018.01)
  *H04W 4/02* (2018.01)
  *H04W 12/02* (2009.01)
  *H04W 12/04* (2009.01)

(52) U.S. Cl.
  CPC .......... *H04W 12/02* (2013.01); *H04W 12/04* (2013.01); *H04L 2463/121* (2013.01)

(56) References Cited

U.S. PATENT DOCUMENTS

| | | | | |
|---|---|---|---|---|
| 6,370,125 | B1* | 4/2002 | Belk | H04J 3/0632 370/312 |
| 7,149,239 | B2 | 12/2006 | Hudson | |
| 8,842,571 | B1* | 9/2014 | Yu | H04L 25/26 370/252 |
| 2002/0118771 | A1* | 8/2002 | Larsson | H04L 1/0618 375/267 |
| 2003/0043887 | A1 | 3/2003 | Hudson | |
| 2007/0201365 | A1* | 8/2007 | Skoog | H04L 47/10 370/230.1 |
| 2008/0018521 | A1* | 1/2008 | Sahinoglu | G01S 7/28 342/27 |
| 2010/0135178 | A1 | 6/2010 | Aggarwal et al. | |
| 2010/0257364 | A1* | 10/2010 | Baek | H04L 9/0877 713/170 |
| 2010/0290454 | A1* | 11/2010 | Lundberg | H04J 3/0632 370/352 |
| 2012/0290893 | A1* | 11/2012 | Hauske | H03M 13/3746 714/758 |
| 2014/0016653 | A1* | 1/2014 | Oh | H04W 72/0406 370/474 |
| 2016/0302074 | A1 | 10/2016 | Hekstra et al. | |
| 2018/0011179 | A1* | 1/2018 | Zhang | G01S 11/026 |
| 2018/0131540 | A1* | 5/2018 | Malik | H04L 27/2628 |

OTHER PUBLICATIONS

Poturalski, M. et al. "The Cicada Attack: Degradation and Denial of Service in IR Ranging", IEEE International Conference on Ultra-Wideband, pp. 1-4 (2010).

Poturalski, M. "Distance Bounding with IEEE 802.15.4a: Attacks and Countermeasures", IEEE Transactions on Wireless Communications, vol. 10, Issue. 4, pp. 1334-1344 (Apr. 2011).

Flury, M. et al. "Effectiveness of Distance-Decreasing Attacks Against Impulse Radio Ranging", 3rd ACM Conference on Wireless Network Security, pp. 117-128 (2010).

* cited by examiner

RANGE DETERMINING MODULE AND ASSOCIATED METHODS AND APPARATUS

CROSS-REFERENCE TO RELATED APPLICATIONS

This application claims the priority under 35 U.S.C. § 119 of European Patent application no. 17164622.7, filed on Apr. 3, 2017, the contents of which are incorporated by reference herein.

This invention relates to a range-determining-module and associated methods and apparatus. In particular, although not exclusively, the invention relates to secure ranging using a plurality of range estimates.

According to a first aspect of the present disclosure there is provided a range-determining-module for a transceiver, configured to:
 receive a signal comprising a received-data-packet,
 identify a plurality of known-sequence-sections of the received-data-packet, each section containing a known-data-sequence that is known to the range-determining-module;
 determine a reception-time-stamp associated with each of the plurality of known-sequence-sections;
 verify the received-data-packet using the reception-time-stamps associated with different respective known-sequence-sections of the received-data-packet; and
 provide a verified range estimate in accordance with one or more of the time stamps of the verified received-data-packet.

In one or more embodiments, verifying the received-data-packet may comprise comparing (i) a reception-time-stamp associated with a first known-sequence-section with (ii) a reception-time-stamp associated with a second known-sequence-section. The comparison of the reception-time-stamps may be used to determine whether an observed spacing between the reception-time-stamps matches an expected spacing within a threshold level.

In one or more embodiments, the range-determining-module may be configured to determine a first packet-round-trip using a first reception-time-stamp associated with a first known-sequence-section of the plurality of known-sequence-sections. The range-determining-module may be configured to determine a second packet-round-trip using a reception-time-stamp associated with a second known-sequence-section of the plurality of known-sequence-sections. The first known-sequence-section may be a different section from the second known-sequence-section. Verifying the received-data-packet may comprise comparing the first packet-round-trip with the packet-round-trip. A packet-round-trip may be a round-trip-time of the packet, or a related quantity. The received-data-packet may be verified if the first packet-round-trip time matches the packet-round-trip time.

In one or more embodiments, the range-determining-module may be configured to transmit a transmission-data-packet having a plurality of known-sequence-sections. Each known-sequence-section may contain a known-data-sequence and may be associated with a respective transmission-time.

In one or more embodiments, the transmission-data-packet may be generated in compliance with IEEE 802.15.4. The transmission-data-packet may have a payload. The known-data-sequence may be modulated in the same way as, or provided by, a preamble, physical layer header (PHR), or payload data of a data packet. The range-determining-module may be configured to generate the payload having one or more of the known-sequence-sections. The one or more known-sequence-sections may be provided only in the payload. The range-determining-module may be configured to generate the payload having a physical layer header comprising an indication that the payload comprises the one or more of the known-sequence-sections.

In one or more embodiments, the known-sequence-sections may be temporally separated from one another within the received-data-packet or transmitted-data-packet. The known-sequence-sections may not be contiguous in the time domain within the received-data-packet or transmitted-data-packet.

In one or more embodiments, the known-sequence-sections comprise more than two sections. Neighbouring known-sequence-sections may be equidistantly spaced-apart from one-another in the time domain.

In one or more embodiments, the known-sequence-sections of the received-data-packet may contain the same known-data-sequence. Alternatively, one of the known-sequence-sections may contain a first known-data-sequence and another of the known-sequence-sections may contain a different, second known-data-sequence. One or more of the known-data-sequences may comprise a stream of synchronisation symbols. One or more of the known-data-sequences may comprise a security codeword or encryption code.

In one or more embodiments, the range-determining-module may be configured to generate a session encryption key. The range-determining-module may be configured to provide the session encryption key in the transmission-data-packet. The range-determining-module may be configured to encrypt the transmission-data-packet with a public encryption key before the transmission-data-packet is transmitted to a remote transceiver.

In one or more embodiments, the range-determining-module may be configured to determine, for each section of the received-data-packet, a packet-round-trip by comparing the time stamp associated with a particular known-sequence-section with the transmission-time of a corresponding known-sequence-section of the transmission data packet.

In one or more embodiments, the range-determining-module may be configured to determine whether to examine the payload for a known-data-sequence based on an indication in a physical layer header of the payload.

According to a further aspect of the disclosure there is provided a remote transceiver for communicating with a range-determining-module, configured to:
 generate a data packet complying with IEEE 802.15.4 and comprising a plurality of plurality of known-sequence-sections, each section containing a known-data-sequence that is known to the range-determining-module; and
 transmit the packet to the remote transceiver.

In one or more embodiments, the remote transceiver may be configured to generate the payload having one or more of the known-sequence-sections. The remote transceiver may be configured to generate the payload having a physical layer header comprising an indication that the payload comprises the one or more of the known-sequence-sections. Reserved bit #10 of the physical layer header may be indicative of whether the payload comprises at least one known-sequence-section for use by the range-determining-module to determine a reception-time-stamp of the data packet. The remote transceiver may be configured to encrypt the payload.

In one or more embodiments, the remote transceiver may be configured to receive a data packet from another transceiver. The remote transceiver may be configured to decrypt payload data in the received-data-packet using a shared encryption key, to obtain a new session key. The remote transceiver may be configured to generate the data packet based on the received-data-packet by encrypting payload data in the received-data-packet with the session key.

According to a further aspect of the disclosure there is provided a data packet with a payload. The payload may have a physical layer header complying with IEEE 802.15.4. Reserved bit #10 of the physical layer header may be indicative of whether the payload comprises at least one known-sequence-section for use by the range-determining-module to determine a reception-time-stamp of the data packet.

Also disclosed is a system comprising a remote transceiver described herein and a second transceiver comprising a range-determining-module described herein.

According to a further aspect of the disclosure there is provided a method for operating a range determining module for a transceiver, comprising:

receiving a signal comprising a received-data-packet,
identifying a plurality of known-sequence-sections of the received-data-packet, each known-sequence-section containing a known-data-sequence that is known to the range-determining-module;
determining a reception-time-stamp associated with each of the plurality of known-sequence-sections;
verifying the received-data-packet using the reception-time-stamps associated with different respective known-sequence-sections of the received-data-packet; and
providing a verified range estimate in accordance with one or more of the time stamps of the verified received-data-packet.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

Figure 1:
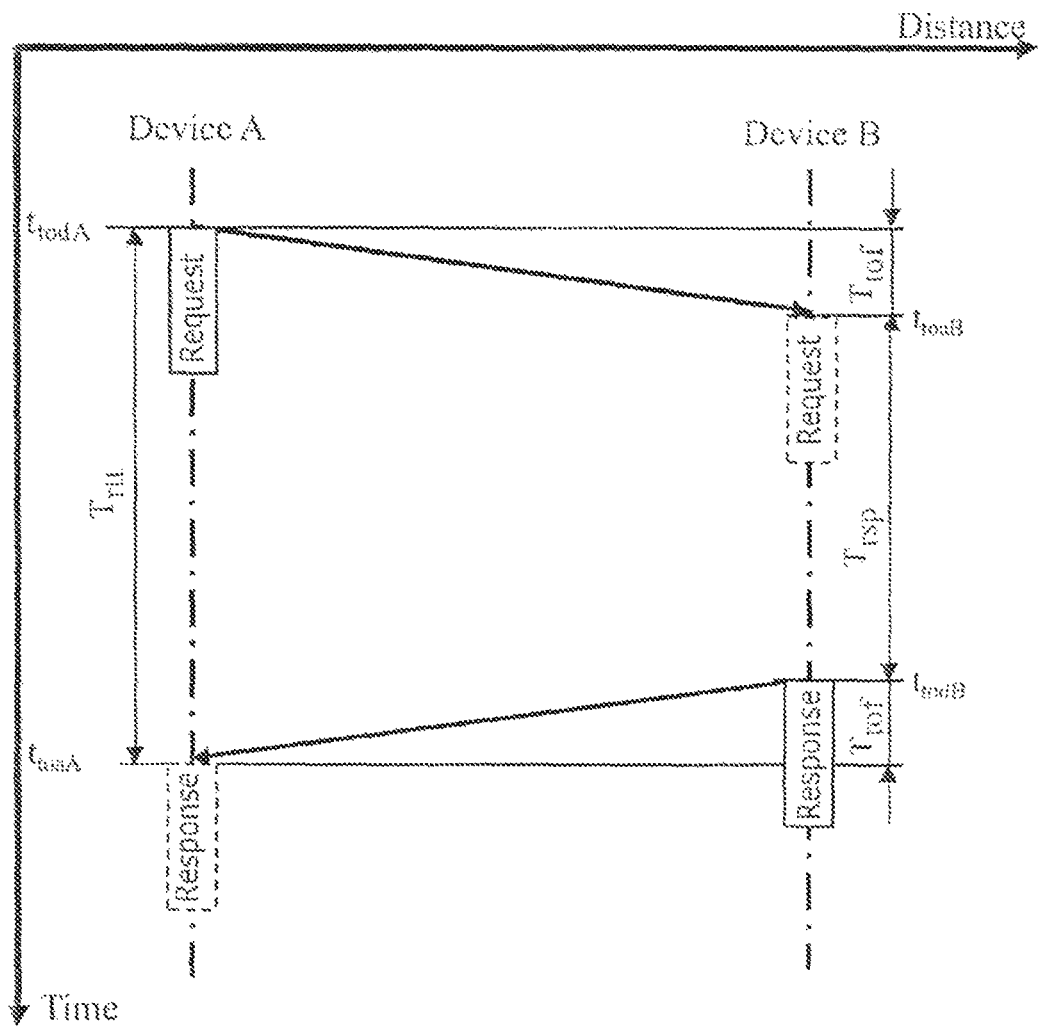
FIG. 1 shows a timing diagram for calculating a time-of-flight (ToF) between two devices.

FIG. 1 illustrates the principle of calculating the ToF between two devices, A and B, using Time-of-Arrival (ToA) and Time-of-Departure (ToD) measurements for RF packets transmitted there between. The procedure starts with Device A transmitting a 'Request' packet to Device B with a measured ToD ($t_{todA}$). Upon receipt of the Request packet, Device B measures the ToA ($t_{oaB}$) and transmits a 'Response' packet back to Device A with a measured (or predetermined) ToD ($t_{todB}$). Upon receipt of the Response packet, Device A measures the ToA of the Response packet ($t_{toaA}$). From the measured (or otherwise derived) ToDs and ToAs, a roundtrip duration ($T_{rrt}=t_{todA}-t_{toaA}$) and a response duration ($T_{rsp}=t_{toaB}-t_{todB}$) can be calculated. The ToF between the devices A and B may then be estimated from the roundtrip duration and response duration: ToF=$0.5*(T_{rrt}-T_{rsp})$.

Figure 2:
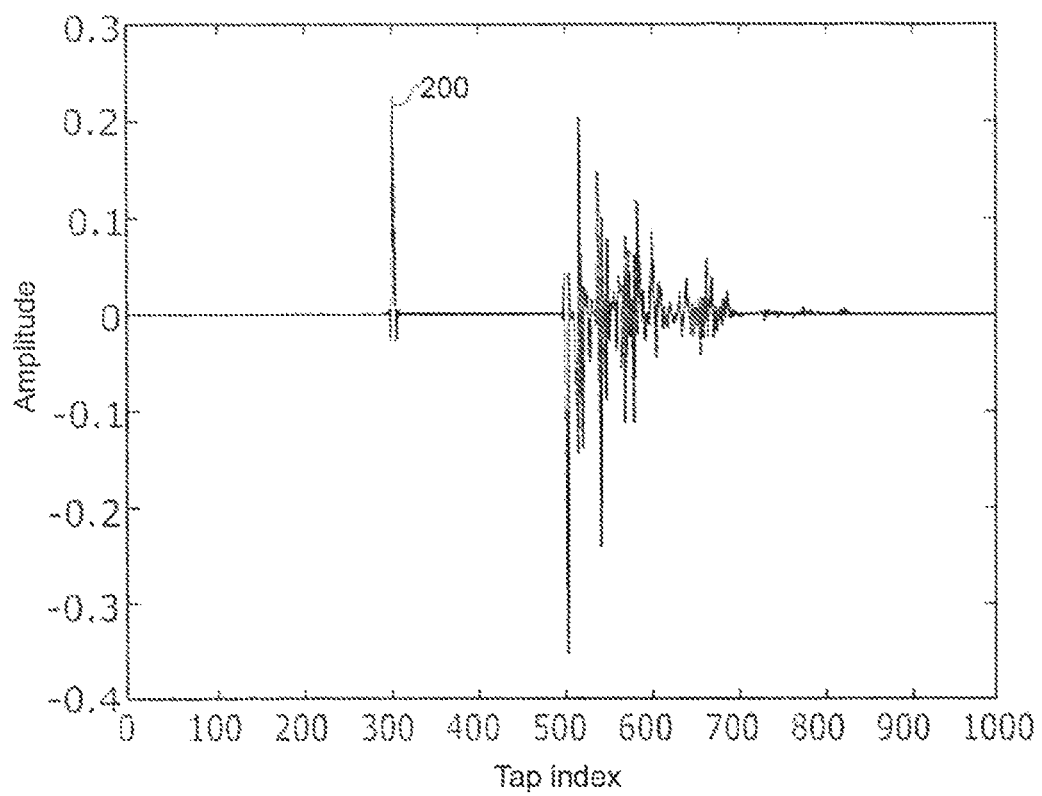
FIG. 2 illustrates an example of a channel impulse response.

In a multipath environment, the ToAs for the most direct (shortest) path, i.e. the 'Line-of-Sight' (LoS) path, between the two devices should be measured and used for accurately calculating the distance between two devices. Accordingly, the first arriving path for the respective RF packet needs to be found. In order to enable a receiving device to identify the first arriving path for an RF packet, the receiving device derives a channel estimate to describe the multipath environment. FIG. 2 illustrates an example of such a channel estimate, with the first non-zero tap, such as indicated at 200 in FIG. 2, typically representing the first path within the multipath environment between the two devices. Significantly, the LoS path signal may not be the strongest signal received by the receiver, for example when a blocking object is located directly between the transmitting device and the receiving device. As such, the tap 200 within the channel estimate representing the LoS path may not have the highest amplitude within the channel estimate.

Accordingly, the LoS path within a multipath environment is conventionally found by identifying the first non-zero tap within the channel estimate.

Figure 3:
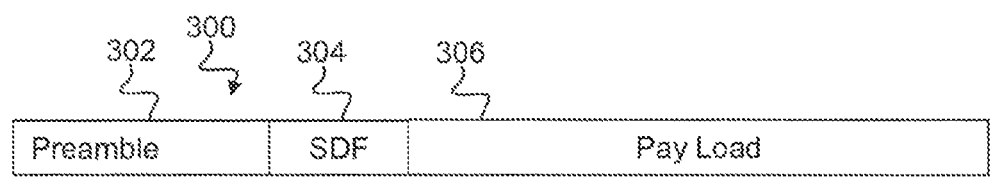
FIG. 3 illustrates a simplified block diagram of a packet for IEEE 802.15.4.
Figure 4:
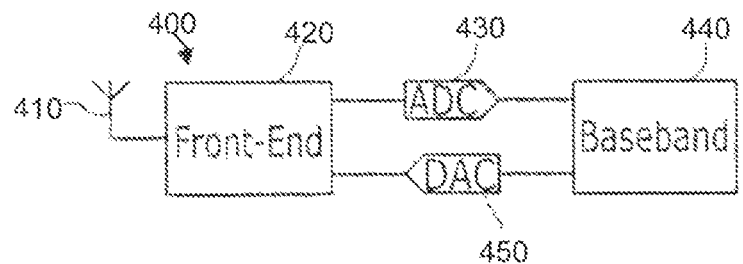
FIG. 4 illustrates a simplified block diagram of an example of part of a wireless radio frequency (RF) device.

A receiving device is able to derive a channel estimate in relation to a transmitting device using known patterns within a received-data-packet from the transmitting device. For example, in IR-UWB (Impulse Radio-Ultra-WideBand) systems, such as defined in IEEE 802.15.4 (IEEE Standard for Low-rate Wireless Personal Area Networks (WPANs)), a preamble comprising repeating synchronisation symbols and a Start-of-Frame Delimiter (SFD) is placed in front of a payload segment. In IR-UWB receivers, the repeating synchronisation symbols within the preamble of a received-data-packet may be used to derive a channel estimate for the received-data-packet. FIG. 3 illustrates an example packet 300, or frame, having a preamble 302 preceding a SFD 304 and a payload segment 306.

However, conventional approaches to identifying the LoS path for a multi-channel environment are susceptible to 'attacks' that can result in a false 'first' path being detected, and thus an incorrect (early) ToA measurements being taken.

Figure illustrates a simplified block diagram of an example of part of a wireless radio frequency (RF) communication device 400. The communication device 400 includes an antenna 410 for receiving and transmitting RF signals over an air interface. The antenna 410 is coupled to front-end circuitry 420. The front-end circuit 420 typically consists of a receive path including, for example, a low noise amplifier, mixer and band-pass filter, and a transmit path including, for example, a mixer, filter and power amplifier. The receive path of the front-end circuit 420 is coupled to a baseband range-determining-module 440 of the communication device 400 via an analogue-to-digital converter (ADC) 430, via which received signals are passed from the front-end circuit 420 to the baseband range-determining-module 440. The transmit path of the front-end circuit 420 is coupled to the baseband range-determining-module 440 via a digital-to-analogue converter (DAC) 450, via which signals to be transmitted are passed from the baseband range-determining-module 440 to the front-end circuit 420.

Figure 5:
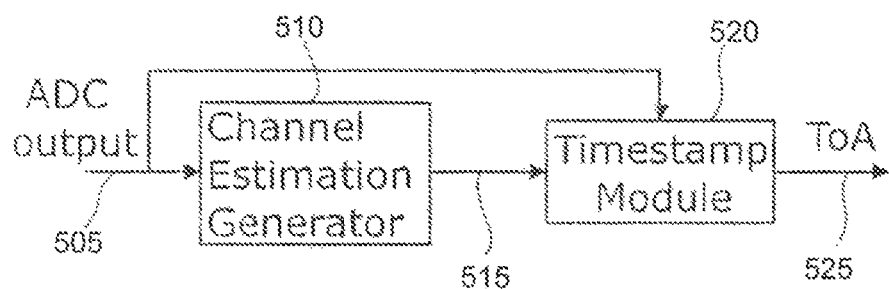
FIG. 5 illustrates a simplified block diagram of a part of a baseband processing module.

The baseband range-determining-module 440 of the communication device 400 is arranged to perform Time-of-Arrival (ToA) measurements on data packets within received RF signals. FIG. 5 illustrates a simplified block diagram of a part of the baseband range-determining-module 440 arranged to perform ToA measurements on received-data-packets.

A channel estimate generator component 510 is arranged to receive the digital representation of the received RF signal 505 output by the ADC 430 and to generate channel estimate information 515 for a multipath transmission channel between the communication device 400 and a transmitter device from which the received RF signal is being transmitted. A timestamp module 520 is arranged to receive the channel estimate information 515 generated by the channel estimate generation component 510, and the digital representation of the received RF signal 505, and to determine a ToA measurement 525 for a marker within a packet within the received RF signal based at least partly on the channel estimate information 515. For example, a signal received via a multipath channel will comprise a plurality of multipath components, which will show up in the taps of the channel impulse response estimate. The timestamp module 520 may be arranged to identify a Line-of-Sight (LoS) component of the received signal based on the channel estimate information 515, and to determine a ToA measurement 525 for a marker within the packet for the LoS component of the received signal.

It will be appreciated that various mechanisms for performing channel estimation are known in the art, and a detailed discussion of the implementation of the channel estimation unit is outside of the scope of the present disclosure. In general terms, the channel estimation component 510 may including a symbol correlator arranged to receive the digital representation of the received RF signal 505 output by the ADC 430, and to perform cross-correlation of the received signal 505 with a reference pattern. The correlator may compare the reference pattern to a section of the frame 300, such as the pre-amble 302, to determine when a match occurs.

The compared patterns may be synchronisation symbols, as in a IEEE standard compliant preamble, or a secure preamble, such as a code word.

A difficulty with known methods of determining range estimates in UWB systems is that a single range estimate may be compromised by a brute force or systematic attack.

Figure 6:
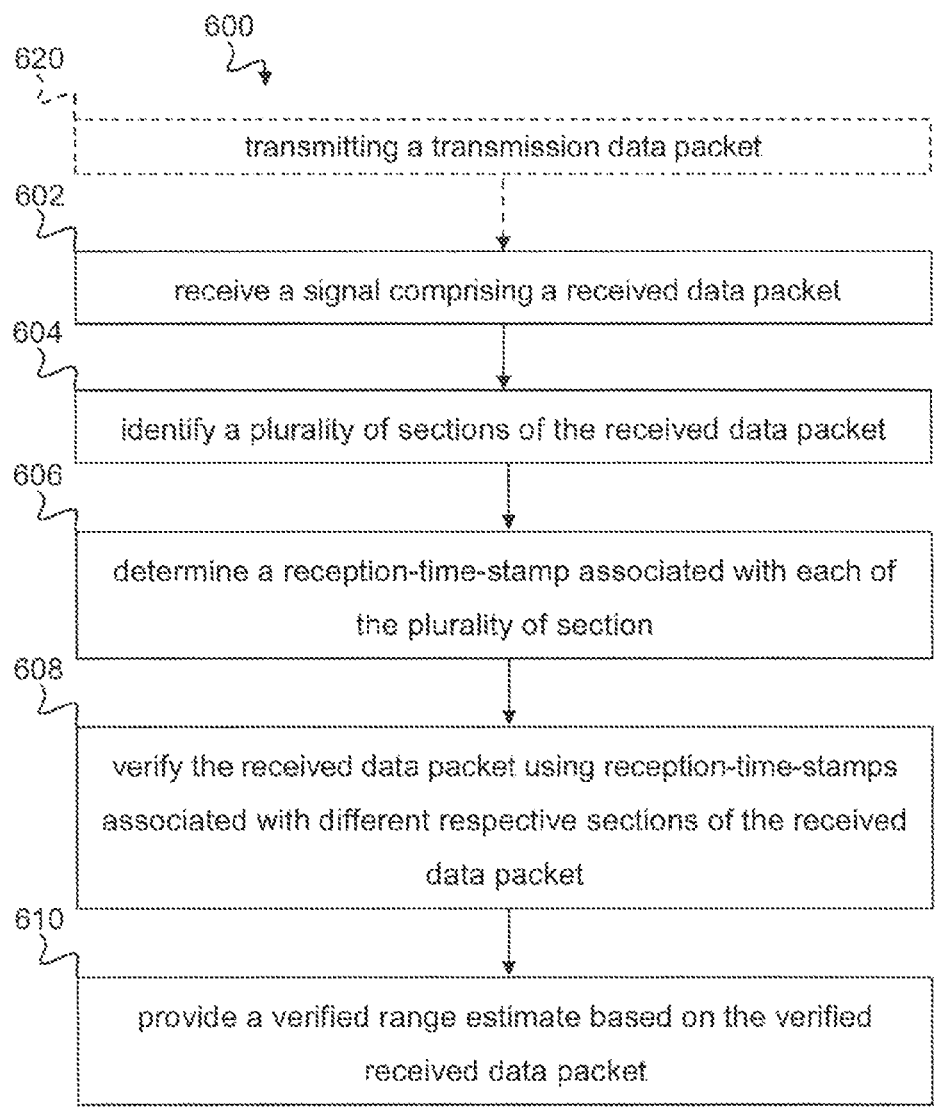
FIG. 6 illustrates a method for operating a range-determining-module for a transceiver.

FIG. 6 illustrates a method 600 for operating a range-determining-module for a transceiver. In this method, a plurality of reception-time-stamps from a respective plurality of sections of a frame are compared in order to reduce the probability of a successful attack by orders of magnitude.

A signal comprising a received-data-packet is received 602 by a range-determining-module of the transceiver. A plurality of known-sequence-sections of the received-data-packet are identified 604. Each known-sequence-section contains a known-data-sequence that is a priori known to the range-determining-module. The known-data-sequence may be a stream of synchronisation symbols or a secure training sequence. The known-data-sequence may be modulated the same way as a preamble, physical layer header (PHR), or payload data of a data packet. The secure training sequence is also referenced as Secure Preamble or security codeword in this text. A correlation pattern that corresponds to the, or each, known-data-sequence may be stored in the range-determining-module, or may be generated by the range-determining-module for comparison with the known-data-sequence.

A reception-time-stamp associated with each of the plurality of known-sequence-sections, and so with each of the known-data-sequences, is determined 606. The reception-time-stamps may be generated based on a respective plurality of channel estimates, as is known in the art and described previously with reference to FIG. 5. In that case, each channel estimate is associated with a corresponding known-sequence-section of the received-data-packet. Each channel estimation may be generated by performing a cross-correlation between one of the known-data-sequences within the received-data-packet and a validation pattern.

The received-data-packet is verified 608 using reception-time-stamps associated with different respective known-sequence-sections of the received-data-packet. The verification may comprise comparing a reception-time-stamp associated with a first known-sequence-section with a reception-time-stamp associated with a second known-sequence-section. Alternatively, the comparison of the reception-time-stamps associated with different respective known-sequence-sections may be an indirect comparison using values derived from the reception-time-stamps, such as packet round trip times. For example, first and second packet-round-trip times may be determined using the respective first and second reception-time-stamps and the received-data-packet may be verified by comparing the first packet-round-trip with the second packet-round-trip.

In cases where the frame has been the subject of an attack, the comparison of the different reception-time-stamps may detect a difference that is due to a time difference, a phase difference or a frequency difference between the known-sequence-sections due to an attack on the signal. The packet may be considered to be valid, or not the subject of an attack, when there is no difference been the reception-time-stamps of its known-sequence-sections, or when the differences are less than a threshold level. The threshold level may be defined as 1, 2 or 5 times the standard deviation of the estimated parameter, for example. In the case that the packet is determined to be valid, a verified range estimate may be provided 610 based on one or more of the time stamps of the verified received-data-packet. In this way, the chance of an attack being successful is reduced or minimized by the cross-checking of multiple first path estimates.

Figure 7:
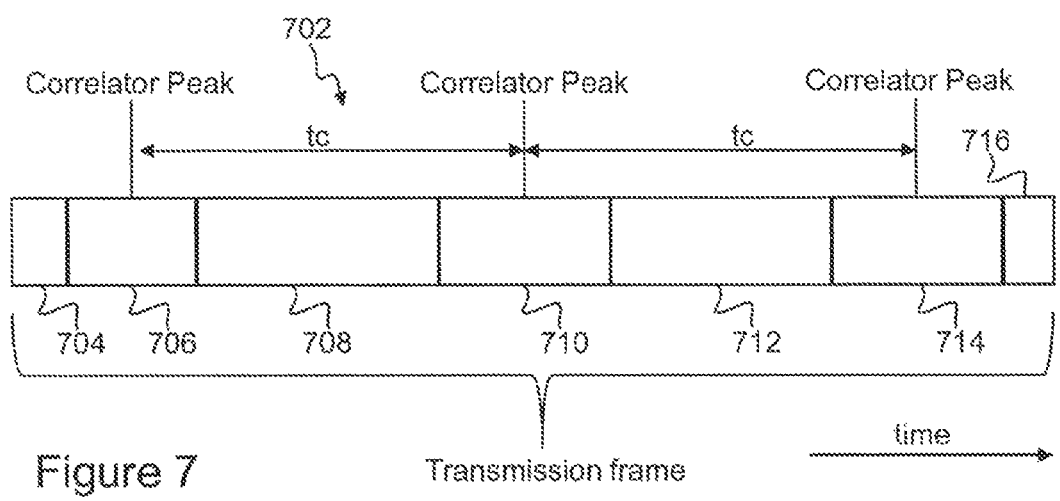
FIG. 7 illustrates a received-data-packet in the method of FIG. 6.

FIG. 7 illustrates a portion of a data packet 702, or transmission frame, for use as a received-data-packet in the method of FIG. 6. The received-data-packet comprises a plurality of payload data 704, 708, 712, 716, each of which is separated by known-sequence-sections 706, 710, 714, which may be indicated by a start-of-frame delimiter (SFD). A guard interval may be inserted before and after the known-sequence-section to simplify the channel estimation as well as the ToA measurement. The known-sequence-sections 706, 710, 714 are temporally separated from one another within the received-data-packet 700. That is, the known-sequence-sections 706, 710, 714 are not contiguous in the time domain. The payload data 704, 708, 712, 716 are also not contiguous in the time domain. The portion of the data packet illustrated in FIG. 7 may be provided in the payload data segment of a IEEE 802.14.5 data packet. An advantage of providing the known-sequence-sections in this way, as opposed to in the pre-amble of a data packet is that the system may then be implemented in a standard compliant manner while maintaining the benefits of improved security offered by the inspection of multiple known-sequence-sections.

In general, each of the plurality of known-sequence-sections of the received-data-packet may contain the same known-data-sequence, for comparison with a single correlation pattern. Alternatively, one of the plurality of known-sequence-sections may contain a first known-data-sequence and another of the plurality of known-sequence-sections may contain a different, second known-data-sequence, for comparison with respective correlation patterns. In such examples, the first known-data-sequence may be a stream of synchronisation symbols and the second known-data-sequence may be a security codeword, encryption code or payload. In general, each of the known-data-sequence-sections may be a stream of synchronisation symbols or a security codeword, encryption code or payload.

Using the data packet of FIG. 7, for example, the method of FIG. 6 may be used to verify the integrity of the received-data-packet by crosschecking reception-time-stamps between multiple known-data-sequences that are received in a single frame. The received-data-packet may be verified by performing a frame internal time consistency check, which relates to the determination of the arrival time, or a reception-time-stamp, for each of the section of the data packet that contains a known-data-sequence that is known to the range-determining-module.

In such examples, the known-sequence-sections 706, 710, 714 are provided by a remote transceiver with a predetermined spacing within the received-data-packet. The predetermined spacing is known to the range-determining-module as an expected packet spacing. In the example shown in FIG. 7, the known-sequence-sections 706, 710, 714 are equidistantly spaced in the time domain within the data packet 700.

In order to perform the frame internal time consistency check, a transmitter transmits the data packet 700 and the range-determining-module of the receiver generates a plurality of time stamps, as described previously regarding FIG. 6. Each time stamp is associated with one of the plurality of known-sequence-sections 706, 710, 714. The range-determining-module of the receiver then determines whether an observed spacing between the known-sequence-sections 706, 710, 714 matches an expected spacing. A difference between the observed spacing and the expected spacing may have been caused by a random attack on the frame. The frame can therefore be flagged as unverified if the expected spacing does not match the observed spacing within a threshold level. The threshold level may be defined as 1, 2 or 5 times the standard deviation of the estimated parameter, for example.

Figure 8:
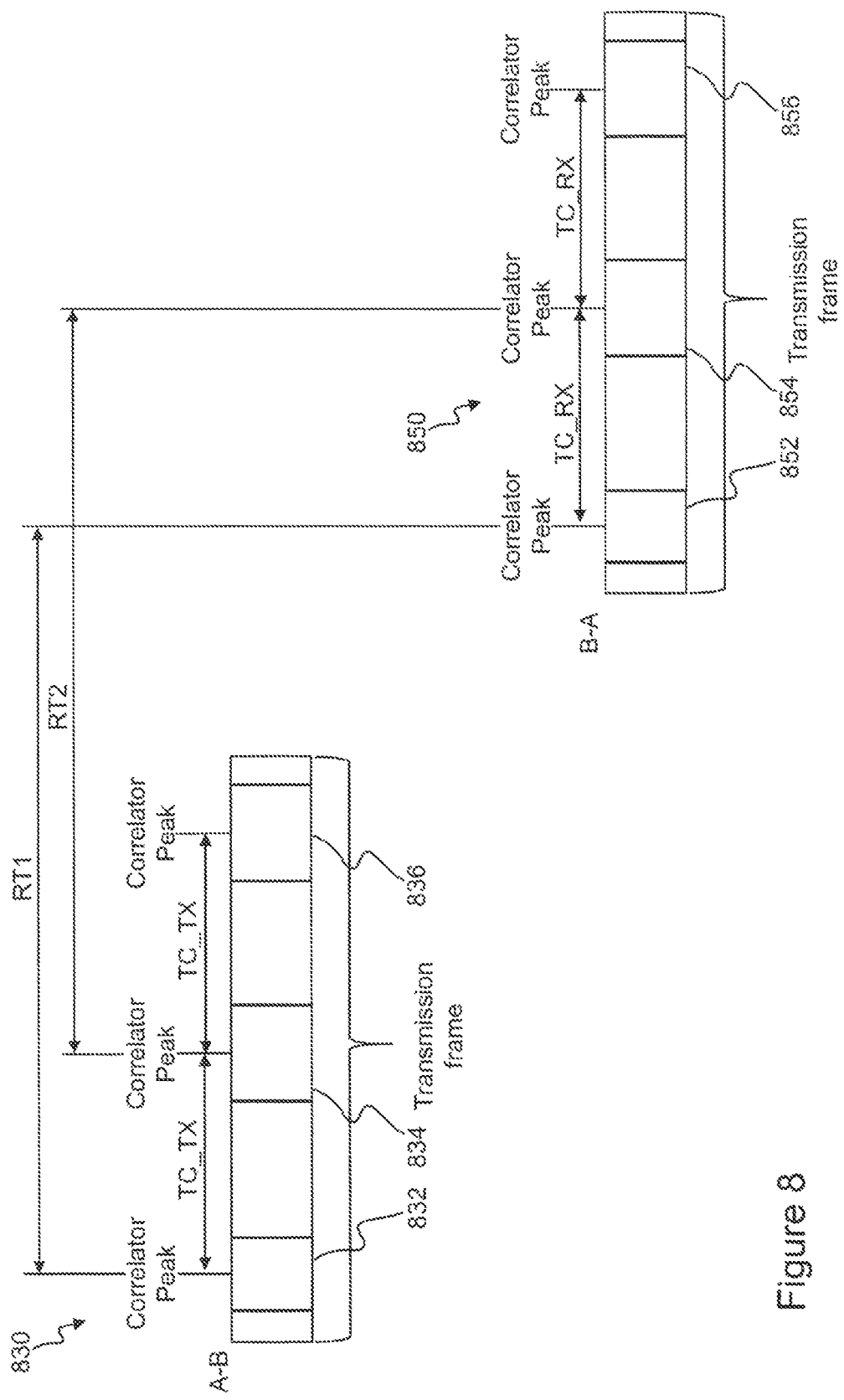
FIG. 8 illustrates a timing diagram with a transmitted-data-packet and a received-data-packet.

FIG. 8 illustrates a timing diagram with a transmitted-data-packet 830 transmitted by range-determining-module of a transceiver and a received-data-packet 850 subsequently received by the same transceiver. The received-data-packet 850 is generated by a remote transceiver in response to reception of the transmitted-data-packet 830 by the remote transceiver. The received-data-packet 850 generally corresponds to the transmitted-data-packet 830.

The transmitted-data-packet 830 comprises a first known-sequence-section 832, a second known-sequence-section 834 and, optionally, a third known-sequence-section 836. Each known-sequence-section 832, 834, 836 contains a known-data-sequence for comparison with a correlation pattern. The first, second and third known-sequence-sections 832, 834, 836 are transmitted sequentially in that order. A transmission time is associated with each of the first, second and third known-sequence-sections 832, 834, 836. The first known-sequence-section 832 is temporally spaced from the second known-sequence-section 834 by a first internal frame period TC_TX1. The second known-sequence-section 834 is temporally spaced from the third known-sequence-section 36 by a second internal frame period TC_TX2. That is, the second known-sequence-section 834 is not contiguous with the first known-sequence-section 32 or the third known-sequence-section 836. The first internal frame period TC_TX1 may be the same as or different to the second internal frame period TC_TX2.

Similarly, the received-data-packet 850 comprises a first known-sequence-section 852, a second known-sequence-section 854 and, optionally, a third known-sequence-section 856, which generally correspond to those of the transmitted-data-packet 830. A reception timestamp, generated by the range-determining-module, is associated with each of the known-sequence-sections 852, 854, 856 of the received-data-packet 850.

The first and second internal frame periods TC_TX1, TC_TX2 may be used to perform a frame internal time consistency check, as described previously.

In addition or alternatively to the frame internal time consistency check, a plurality of round-trip measurements may be performed in order to validate the received-data-packet 850, as described below. Returning to FIG. 6, the method 600 may further include transmitting 620 a transmitted-data-packet using the transceiver. The transmitted-data-packet has a plurality of known-sequence-sections that each contains a known-data-sequence and is associated with a respective transmission time. The transceiver performing the method 600 is in communication with a remote transceiver, which receives the transmitted-data-packet and repeats the transmitted-data-packet back, so that it can be received 602 by the transceiver.

In this case, the data packet is verified 608 in accordance with a comparison between the range estimates for different respective known-sequence-sections of the received-datadata-packet may have been subject to tampering by an attacker. The received-data-packet is verified if the range estimates do match.

Regarding the example illustrated in FIG. 8, the received-data-packet 850 may be deemed invalid if a first round-trip time RT1 associated with the first known-sequence-sections 832, 852 of the transmitted and received-data-packets 830, 850 is different from a second round-trip time RT2 associated with the second known-sequence-sections 834, 854 of the transmission and received-data-packets 830, 850. The first round-trip time RT1 is the duration, as determined by the range-determining-module of the transceiver, between the transmission time of the first known-sequence-section 832 of the transmitted-data-packet 830 and the timestamp of the receipt of the first data packet 852 of the received-data-packet 850. The second round-trip time RT2 is the duration, as determined by the range-determining-module of the transceiver, between the transmission time of the second known-sequence-section 834 of the transmitted-data-packet 830 and the timestamp of the receipt of the second data packet 854 of the received-data-packet 850. A corresponding third round-trip time RT3 for use in the verification of the received-data-packet 850 may be determined for the third known-sequence-sections 836, 856 of the transmitted and received-data-packets 830, 850. A round-trip distance may be determined from the round-trip time (less a time constant associated with a signal processing time) divided by the propagation velocity of the signal. The range estimate is half of the round-trip distance.

Figure 9:
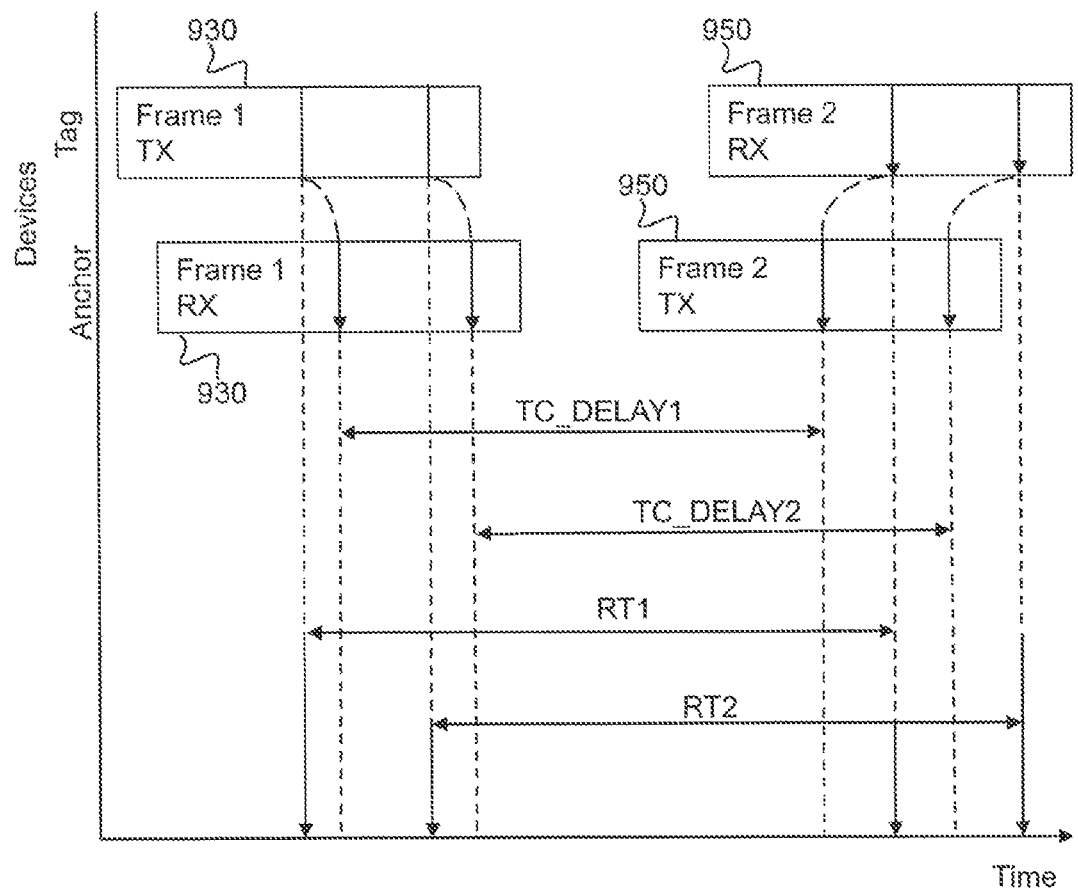
FIG. 9 illustrates a further timing diagram with a transmitted-data-packet and a received-data-packet.

FIG. 9 illustrates a further timing diagram illustrating packets in a system comprising a transceiver with a range-determining-module and a remote transceiver. In general, one of the transceivers may be provided in a tag, such as a key fob for a vehicle, and the other transceiver may be provided in a base station, which may be provided in a vehicle.

A transmitted-data-packet 930 is transmitted by the range-determining-module of the transceiver to the remote transceiver. A received-data-packet 950 subsequently received by the same transceiver from the remote transceiver. The received-data-packet 950 is generated by the remote transceiver in response to reception of the transmitted-data-packet 930 by the remote transceiver. The received-data-packet 950 generally corresponds to the transmitted-data-packet 930.

A first round trip time RT1 and a second round trip time RT2 are illustrated, and correspond to same quantities discussed previously regarding FIG. 8. FIG. 9 also illustrates internal delays TC_DELAY1, TC_DELAY2 that occur at the remote transceiver. A first internal delay TC_DELAY1 represents the signal processing time that occurs between the remote transceiver receiving the a first known-sequence-section in the transmitted-data-packet 930 and subsequently retransmitting a corresponding first known-sequence-section in the received-data-packet 950. A second internal delay TC_DELAY2 represents the signal processing time that occurs between the remote transceiver receiving the a second known-sequence-section in the transmitted-data-packet 930 and subsequently retransmitting a corresponding second known-sequence-section in the received-data-packet 950. In general, the second internal delay TC_DELAY2 is similar to the first internal delay TC_DELAY1.

As described previously with reference to FIG. 7, the methods described above for operating a range-determining-module of a transceiver may be performed on a known-data-sequence provided in a payload data of a frame.

Figure 10:
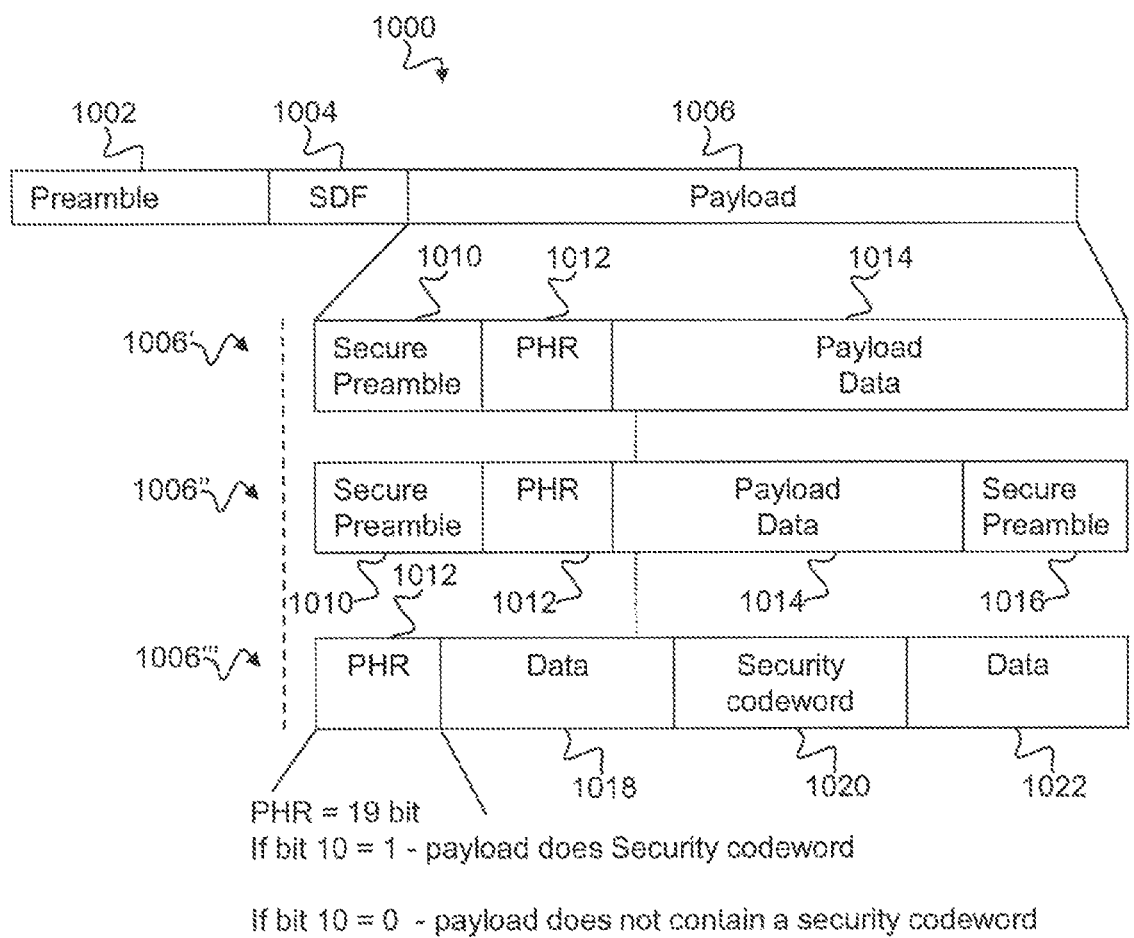
FIG. 10 illustrates example implementations of a packet for use in an IEEE 802.14.5 compliant transceiver.

FIG. 10 illustrates potential implementations of a packet 1000, or frame, for use in an IEEE 802.14.5 compliant transceiver. As described previously regarding FIG. 3, the packet 1000 has a preamble 1002 preceding a SFD 1004 and a payload segment 1006. In this example, each known-sequence-section may be referred to as a secure preamble and contain an encrypted codeword. The known-data-sequence may be modulated the same way as a preamble, physical layer header (PHR), or payload data. In this way, the first path detection can be performed on a known payload data, which may be encrypted by a shared secret, or key.

In one example, the payload segment 1006' may itself comprise a first secure preamble 1010, a physical layer header (PHR) 1012 and payload data 1014. The secure preamble is provided at start of the payload segments 1006'. The PHR 1012 is disposed between the first secure preamble 1010 and the payload data 1014.

In another example, the payload segments 1006" may additionally comprise a second secure preamble 1016. The second secure preamble 1016 is separated from the first secure preamble 1010 by the PHR 1012 and the payload data 1014'.

In an alternative example, the payload segments 1006'" comprises a PHR 1012 at the start of the payload 1006''', followed, in order, by a first portion of payload data 1018, a security codeword 1020 and a second portion of payload data 1022.

The PHR of the payload in the above examples may comprise an indication of whether the payload comprises one or more of the plurality of known-sequence-sections. For example, the currently reserved bit #10 of the IEEE 802.14.5 compliant PHR may be used as indicator. In such examples, a range-determining-module of a transceiver may be configured to determine whether to examine the payload for a known-data-sequence that is known to the range-determining-module based on the PHR.

Figure 11:
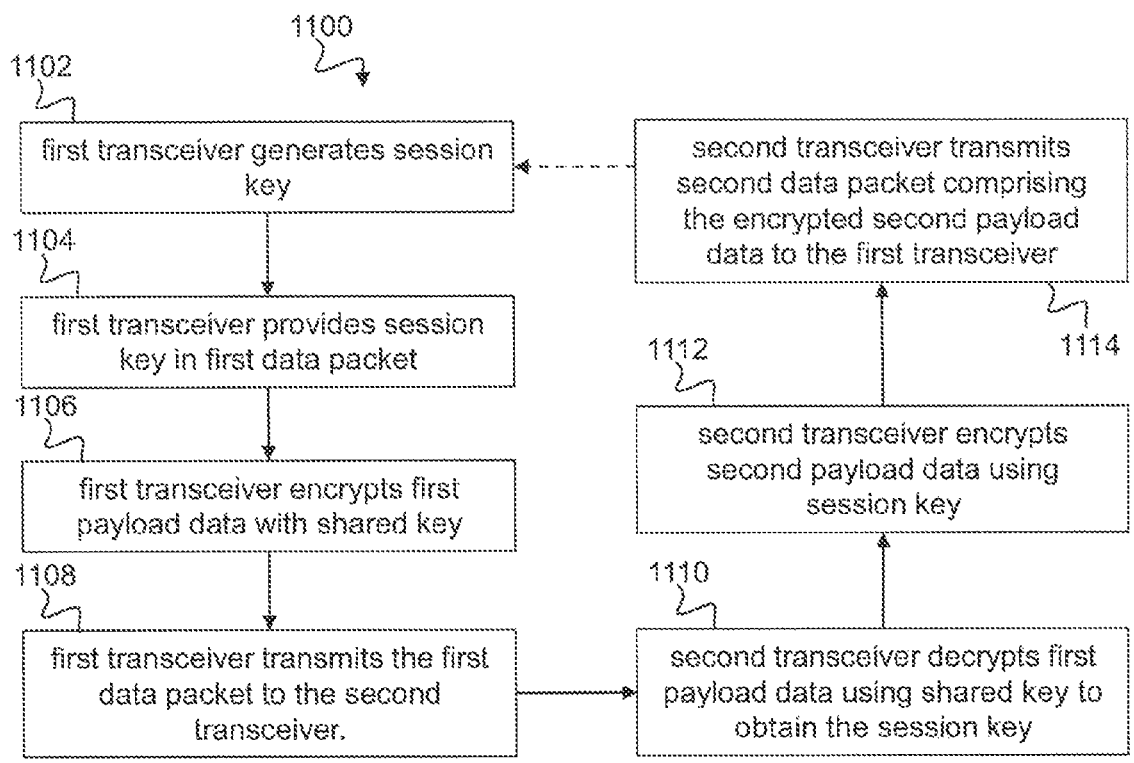
FIG. 11 illustrates a challenge-and-response-type encryption technique which may be applied to the transmitted and received-data-packets.

FIG. 11 illustrates a challenge-and-response-type encryption method 1100 which may be applied to the transmitted and received-data-packets in a communication system comprising a first transceiver and a second transceiver. The transceivers may exchange data packets that comply with IEEE 802.14.5. The first and second transceivers each comprise a shared encryption key, which may be a master or public key and is known a priori by both transceivers. The shared encryption key may be sent to the first transceiver by the second transceiver.

The first transceiver generates 1102 a session key and provides 1104 the session key in first payload data of a first data packet. The first transceiver encrypts 1106 the first payload data with a shared encryption, and transmits 1108 the first data packet to the second transceiver.

The second transceiver decrypts 1110 the first payload data using the shared master (public) key to obtain the session key. The second transceiver encrypts 1112 second payload data using the session key and transmits 1114 a second data packet comprising the encrypted second payload data to the first transceiver.

The first transceiver may then initiate a new cycle of the method using a new session key. The session key of a completed cycle may be used as the shared key for a subsequent cycle.

The first transceiver may comprise a range-determining-module. The second transceiver may be a remote transceiver.

Figure 12:
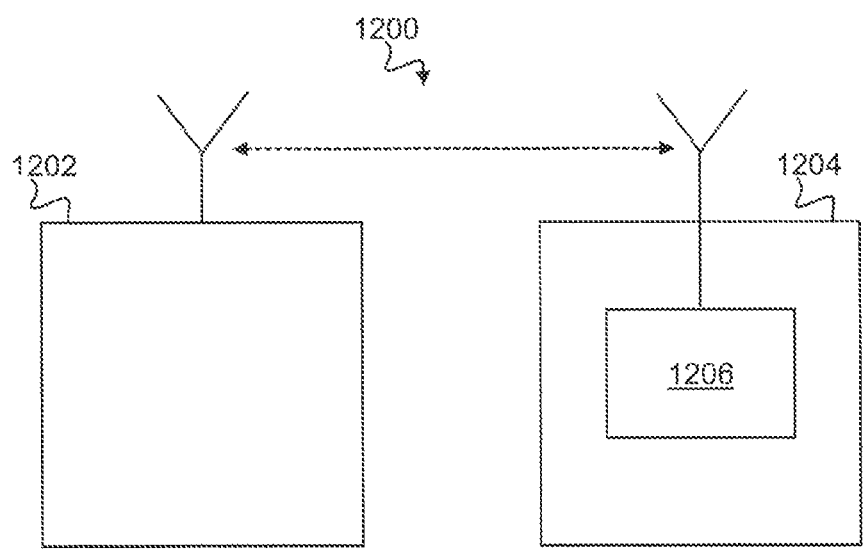
FIG. 12 illustrates a system comprising a remote transceiver and a second transceiver comprising a range-determining-module.

FIG. 12 illustrates a system 1200 comprising a first transceiver 1204 comprising a range-determining-module 1206, and a second, remote transceiver 1202. The remote and second transceivers 1202, 1204 may be used to implement the features of corresponding devices described previously herein.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments, the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A range-determining-module for a transceiver, configured to:

receive a signal comprising a received-data-packet;

identify a plurality of known-sequence-sections of the received-data-packet, each known-sequence-section containing a known-data-sequence that is known to the range-determining-module having a predetermined spacing within the received-data-packet, and not contiguous in a time domain;

determine a plurality of reception-time-stamps, wherein each reception-time-stamp is associated with a respective known sequence-section of the plurality of known-sequence-sections;

verify the received-data-packet using the plurality of reception-time-stamps associated with different respective known-sequence-sections of the received-data-packet; and provide a verified range estimate in accordance with the plurality of reception-time-stamps of the verified received-data-packet.

2. The range-determining-module of claim 1, further configured to verify the received-data-packet by comparing a first reception-time-stamp associated with a first known-sequence-section and a second reception-time-stamp associated with a second known-sequence-section.

3. The range-determining-module of claim 2, further configured to determine whether an observed spacing between the first reception-time-stamp and the second reception-time-stamp matches an expected spacing.

4. The range-determining-module of claim 1, further configured to:

determine a first packet-round-trip using a first reception-time-stamp associated with a first known-sequence-section; and determine a second packet-round-trip using a second reception-time-stamp associated with a second known-sequence-section, wherein the first known-sequence-section is a different section from the second known-sequence-section, and verifying the received-data-packet further comprises:

comparing the first packet-round-trip with the second packet-round-trip.

5. The range-determining-module of claim 4, further configured to transmit a transmission-data-packet having a plurality of known-sequence-sections, in which each known-sequence-section contains a known-data-sequence and is associated with a respective transmission-time.

6. The range-determining-module of claim 5, wherein the transmission-data-packet comprises payload data, and the range-determining-module is further configured to generate the payload data having: one or more of the known-sequence-sections; and a physical layer header comprising an indication that the payload data comprises the one or more of the known-sequence-sections.

7. The range-determining-module of claim 5, further configured to:

generate a session encryption key;

provide the session encryption key in the transmission-data-packet; and encrypt the transmission-data-packet with a public encryption key.

8. The range-determining-module of claim 5, further configured to:

determine, for each section of the received-data-packet, a packet-round-trip by comparing the time stamp associated with a particular known-sequence-section with the transmission-time of a corresponding known-sequence-section of the transmission data packet.

9. A remote transceiver for communicating with a range determining module, configured to:
   generate a data packet with payload data having a physical layer header complying with IEEE 802.15.4 and comprising a plurality of plurality of known sequence sections, each section containing a known data sequence that is known to the range determining module, having a predetermined spacing within the generated data packet, and not contiguous in a time domain; and
   transmit the generated data packet to a second transceiver, wherein the second transceiver determines a plurality of reception timestamps, wherein each reception time stamp is associated with a respective known sequence section of the plurality of known sequence sections, verifies the received data packet using the plurality of reception time stamps associated with different respective known sequence sections of the received data packet and provides a verified range estimate in accordance with the plurality of reception time stamps of the verified received data packet.

10. The remote transceiver of claim 9, further configured to
   generate the payload data having one or more of the known-sequence-sections, wherein the physical layer header comprises an indication that the payload data comprises the one or more of the known-sequence-sections.

11. The remote transceiver of claim 9, further configured to:
   encrypt the payload data.

12. The remote transceiver of claim 11, further configured to:
   receive a data packet from the second transceiver;
   decrypt payload data in the received data packet using a shared encryption key, to obtain a new session key; and
   generate a second data packet based on the received data packet by encrypting payload data in the received data with the session key.

13. The remote transceiver of claim 9, wherein reserved bit #10 of the physical layer header is indicative of whether the payload data comprises at least one known-sequence-section for use by the range-determining-module to determine a reception-time-stamp of the data packet.

14. A system comprising the remote transceiver and the second transceiver of claim 9.

15. A method for operating a range determining module for a transceiver, comprising:
   receiving a signal comprising a received-data-packet;
   identifying a plurality of known-sequence-sections of the received-data-packet, each known-sequence-section containing a known-data-sequence that is known to the range-determining-module, having a predetermined spacing within the received-data-packet, and not contiguous in a time domain;
   determining a plurality of reception-time-stamps, wherein each reception-time-stamp is associated with a respective known sequence-section of the plurality of known-sequence-sections;
   verifying the received-data-packet using the plurality of reception-time-stamps associated with different respective known-sequence-sections of the received-data-packet; and
   providing a verified range estimate in accordance with the plurality of reception-time-stamps of the verified received-data-packet.

\* \* \* \* \*